(12) United States Patent
Dubey et al.

(10) Patent No.: US 8,224,724 B2
(45) Date of Patent: Jul. 17, 2012

(54) METHOD AND SYSTEM FOR ASSOCIATING A COLLATERAL AGREEMENT WITH A RECEIVABLE

(75) Inventors: Avaneesh Dubey, Bangalore (IN); Sriram Kanuri, Bangalore (IN); Sajeev Khan, Bangalore (IN)

(73) Assignee: SAP AG, Walldorf (DE)

( * ) Notice: Subject to any disclaimer, the term of this patent is extended or adjusted under 35 U.S.C. 154(b) by 1872 days.

(21) Appl. No.: 10/810,817

(22) Filed: Mar. 29, 2004

(65) Prior Publication Data

US 2005/0216402 A1 Sep. 29, 2005

(51) Int. Cl.
*G06Q 40/00* (2012.01)

(52) U.S. Cl. .......... 705/35; 705/36 R; 705/38; 707/705; 707/758

(58) Field of Classification Search ............ 705/36, 705/40
See application file for complete search history.

(56) References Cited

U.S. PATENT DOCUMENTS

| | | | | |
|---|---|---|---|---|
| 4,953,085 A * | 8/1990 | Atkins | ............. | 705/36 R |
| 5,323,315 A * | 6/1994 | Highbloom | ............. | 705/38 |
| 5,950,179 A * | 9/1999 | Buchanan et al. | ............. | 705/38 |
| 6,018,721 A * | 1/2000 | Aziz et al. | ............. | 705/36 R |
| 7,480,632 B2 * | 1/2009 | Fudali et al. | ............. | 705/36 R |
| 2001/0034701 A1 * | 10/2001 | Fox et al. | ............. | 705/38 |
| 2003/0126072 A1 * | 7/2003 | Brock | ............. | 705/38 |
| 2003/0144940 A1 * | 7/2003 | Kochansky et al. | ............. | 705/36 |

* cited by examiner

*Primary Examiner* — Elizabeth Rosen

(74) *Attorney, Agent, or Firm* — Kenyon & Kenyon LLP

(57) ABSTRACT

Embodiments of the present invention relate to software for automatically forming links between a collateral agreement and receivable secured by the collateral agreement.

18 Claims, 6 Drawing Sheets

METHOD AND SYSTEM FOR ASSOCIATING A COLLATERAL AGREEMENT WITH A RECEIVABLE

FIELD OF THE INVENTION

Embodiments of the present invention relate to computer software for forming an association or link between a collateral agreement and a receivable secured by the agreement.

BACKGROUND INFORMATION

Collateral is property securing a loan or other obligation. When a borrower makes an agreement with a lender that money loaned to the borrower will be secured by collateral, the agreement may encompass an understanding as to how the collateral may used by the lender. In some settings, such an understanding is known as a "declaration of purpose."

A declaration of purpose determines the scope or extent to which a collateral agreement can be used for securing a set of receivables. A declaration of purpose may be global or specific. A global declaration of purpose secures a set of current and future receivables based on a list of arbitrary criteria. A specific declaration of purpose secures a set of current receivables that can be specifically identified (for example, by account number). Thus, a difference between a global declaration of purpose and a specific declaration of purpose is that a global declaration of purpose includes a prospective element: i.e., it may define arbitrary criteria to be applied to receivables not yet existing.

As noted above, a collateral agreement described by a declaration of purpose secures a "receivable." A receivable is a generalization or abstraction of a lender's risk based on a transaction with a borrower. A receivable could correspond, for example, to a loan, or to any transaction which creates a credit risk for a lender (e.g., a bank).

An electronic form of a collateral agreement and associated declaration of purpose may be implemented by means of computers and software. In such implementations, the collateral agreement and associated declaration of purpose may, for example, be created using a user interface comprising a display device and input devices such as a keyboard and mouse, and the associated software. Such systems may model the collateral agreement and associated declaration of purpose, and related information, in records stored electronically on a machine-readable medium such as disk, subsequently retrieved, modified and stored again as is well known in connection with electronic records.

FIG. 1 shows, among other things, a collateral agreement 100 and an associated global declaration of purpose 102. Past approaches (represented in FIG. 1) to computerized implementation of such information have correlated receivables (e.g., receivables 1, 2) secured by a collateral agreement (e.g. agreement 100) with the collateral agreement in terms of borrower information 101. FIG. 1 further illustrates that a specific declaration of purpose 103 associates a specific collateral agreement (e.g. agreement 100) with a specific receivable (e.g., receivable 3) secured by the collateral agreement. Using an arrangement as shown in FIG. 1, information concerning the documents involved might be retrieved, and viewed, updated or otherwise processed for various business purposes.

However, disadvantages exist in the above-described arrangement. For example, it may be seen in FIG. 1 that there is no direct logical association or link made between the collateral agreement 100 and the receivables (e.g., receivables 1, 2, 3) that may be secured by the collateral agreement. The absence of such a linkage between collateral agreements and receivables generally means that determination of which receivables are associated with which collateral agreement can be troublesome. As noted, receivables are only correlated with a collateral agreement indirectly in terms of borrower information. Thus, to determine which receivables are associated with which collateral agreement, it might be necessary to determine based on the borrower information which receivables are associated with the borrower, and when this is determined, to derive from this information which receivables are associated with which collateral agreement. The complications associated with such operations can present administrative difficulties in business matters involving collateral agreements. Loan disbursement, and regulatory and balance sheet reporting, for example, can be made more burdensome.

SUMMARY OF THE INVENTION

Disadvantages of past approaches are addressed by embodiments of the present invention. According to the embodiments, a direct logical association or link is automatically formed between a collateral agreement and a receivable secured by the agreement. Advantages associated with such an arrangement include comparatively greater ease of information-gathering for information relating to declarations of purpose and collateral agreements, and therefore comparatively greater ease of administration. For example, when a new loan is created, it may be automatically determined, based on a link automatically formed between the loan and a collateral agreement, whether the loan should be disbursed. This determination could be made, for example, based on whether there is enough collateral to secure the new loan; this information would be readily available due to the link between the new loan and the collateral agreement. Other areas where improved information-gathering provided by the links may be helpful include the areas of regulatory reporting and balance sheet reporting.

According to embodiments, the links may be made not only between a collateral agreement and a receivable as a whole, but also between a collateral agreement and various different components of a receivable. For a specific declaration of purpose, a user is enabled to create a link manually (via a user interface, for example) between a receivable or components thereof and a collateral agreement, and need not specify any criteria. These features further provide for improved information gathering and administrative control.

DETAILED DESCRIPTION

Embodiments of the present invention relate to automatically forming a logical association or link directly between a collateral agreement and a receivable for a global declaration of purpose. According to the embodiments, for a global declaration of purpose, a user may specify arbitrary criteria for determining whether a receivable should be linked to a collateral agreement, or not linked. Based on the criteria, a system executing software according to embodiments of the present invention may automatically form a link directly between the collateral agreement and the receivable. For example, if a new receivable is created, the system may automatically apply the criteria to the new receivable and determine whether to link it to an existing collateral agreement. The link may indicate that the receivable or some component of it is secured by the linked collateral agreement or portion of the linked collateral agreement.

An example of a criterion is an identity of a borrower (one making the declaration). That is, based on an identity of a particular borrower, it may be determined that a receivable assumed by a lender on behalf of the borrower should be linked to a collateral agreement between the borrower and the lender. For a different borrower, on the other hand, it might be determined that a receivable should not be linked. Another example of a criterion is a type of receivable. That is, a criterion might specify, for example, that if a given borrower is taking out a new mortgage loan (one type of receivable), the loan should be automatically linked to a collateral agreement of the borrower. On the other hand, the criterion might specify that for an existing account (another type of receivable) of the same borrower, a link should not be formed to the collateral agreement.

For a specific declaration of purpose, a user is enabled to create a link manually, and need not specify any criteria. Instead, user may simply specify information relating to the links.

Figure 1:
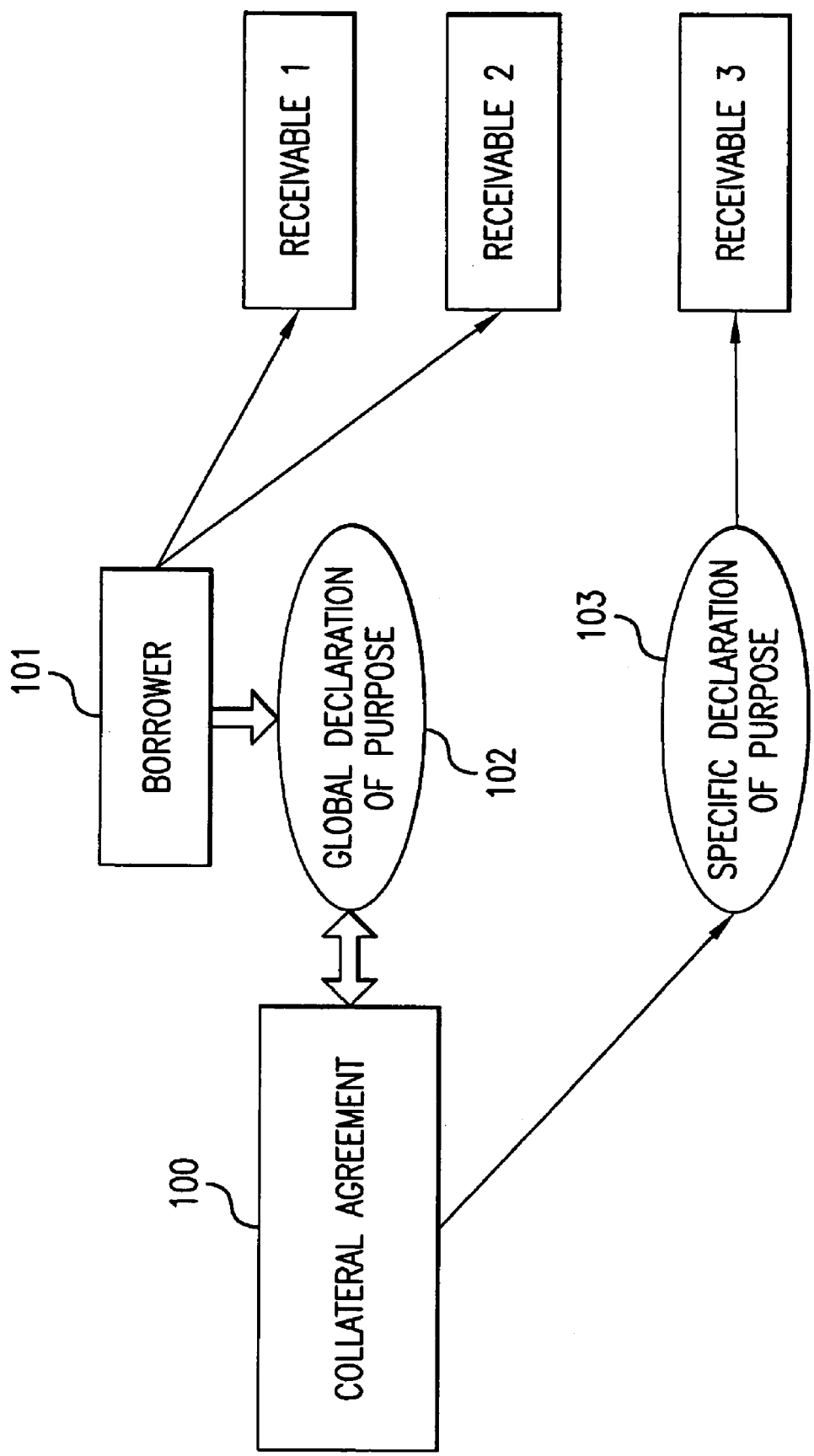
FIG. 1 shows an example of a prior art arrangement.
Figure 2:
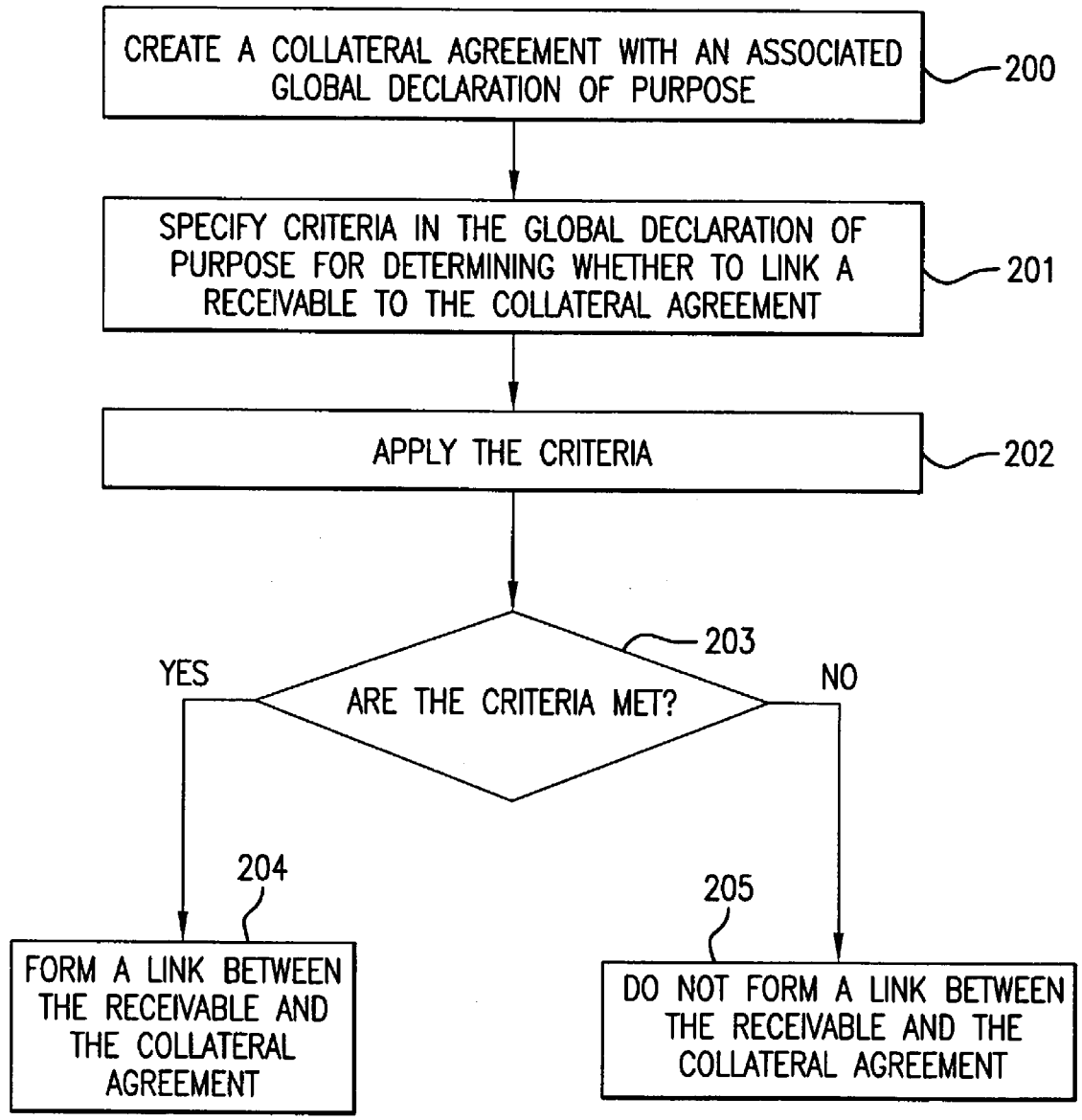
FIG. 2 shows a process flow according to embodiments of the present invention.

FIG. 2 shows a process flow according to embodiments of the present invention. The process may include the execution of program instructions on a computer. Parts of the process may involve processing user inputs entered, for example, via a user interface. For example, as shown in block 200, a collateral agreement may be created by a procedure including the entry of specific values into input fields of a display of a user interface and saving the values on an electronic database. Creating a collateral agreement may involve defining a global declaration of purpose describing the scope of the collateral agreement.

As shown in block 201, arbitrary criteria may be specified in the global declaration of purpose for determining whether to automatically link a receivable or receivables to the collateral agreement. As noted earlier, the criteria can include an identity of a borrower and a type of receivable. Other criteria could include an identifier of an organizational unit and a type of currency used for a receivable. After the criteria are specified for the collateral agreement, the criteria could be saved to an electronic database.

As shown in block 202, the criteria may be applied to determine whether to automatically form a link between a new or existing receivable, and the collateral agreement. If the criteria are met, a link may be automatically formed between the receivable and the collateral agreement, as shown in blocks 203, 204. On the other hand, the criteria are not met, a link will not be formed between the receivable and the collateral agreement, as shown in blocks 203, 205.

Operations represented by blocks 203-205 may be performed based on processing of a collateral agreement, new or existing, or of a receivable, new or existing. More specifically, a user could, for example, invoke application of the criteria through a function key provided on a user interface for handling collateral agreements. If the function key were activated for a particular collateral agreement, for instance, the criteria might be applied to receivables stored in an electronic database, and those receivables meeting the criteria would be automatically linked with the particular collateral agreement. The user might perform such an operation, for example, if the user was creating a new collateral agreement or changing the criteria for an existing collateral agreement, and wanted to determine whether any new linkages should be formed or old linkages discontinued.

On the other hand, the criteria could be applied by handling an existing receivable or creating a new receivable. A user could invoke application of the criteria by activating a function key on a user interface for processing receivables, either new or existing. If the function key were activated for a particular receivable, for instance, attributes of the receivable, such as the identity of the borrower and the type of receivable, might be evaluated against criteria for collateral agreements stored in an electronic database, and the receivable might be automatically linked with any collateral agreement whose criteria were met.

Creation of a collateral agreement as described in the foregoing may more particularly include a definition of "portions" of a collateral agreement. A "portion" as used herein means a part of an overall value of the collateral agreement that is used for securing a receivable or receivables of a particular borrower or set of borrowers. A collateral agreement may be divided into portions based on different respective usages contemplated for the portions, as defined by respective declarations of purpose. Thus, each portion may be associated with either or both of a distinct global declaration of purpose and a specific declaration of purpose.

Figure 3:
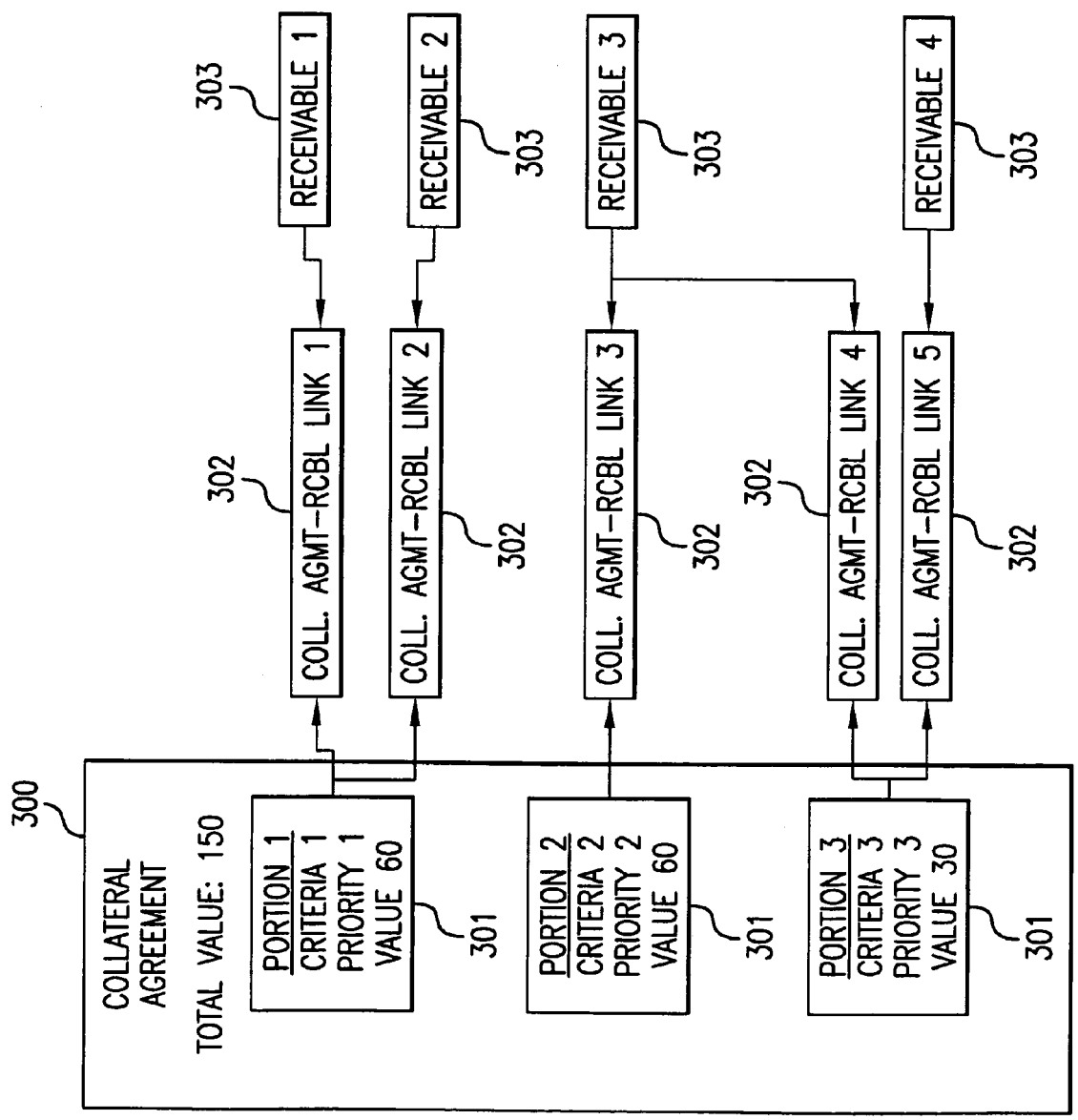
FIG. 3 shows an arrangement of data structures according to embodiments of the present invention.

In view of the above, FIG. 3 shows an arrangement of data structures according to embodiments of the present invention. The data structures could be stored electronically on a machine-readable medium such as disk, for example. As shown in FIG. 3, a collateral agreement 300 may comprise one or more portions 301. Each portion 301 may be logically associated or linked via one or more links 302 with one or more receivables 303. For example, in FIG. 3, portion 1 is linked via collateral-agreement-to-receivable link 1 to receivable 1, and via collateral-agreement-to-receivable link 2 to receivable 2. Portion 2 is linked via collateral-agreement-to-receivable link 3 to receivable 3. Portion 3 is linked via collateral-agreement-to-receivable link 4 to receivable 3 and via collateral-agreement-to-receivable link 5 to receivable 4. As further shown in FIG. 3, each portion may have its own distinct criteria for linking; in the example of FIG. 3, portion 1 has criteria 1, portion 2 has criteria 2, and portion 3 has criteria 3. Each of the links 302 may have been automatically formed based on criteria respectively assigned to portions 1, 2 and 3 using a process as described in connection with FIG. 2.

As still further shown in FIG. 3, each portion may have a value and a priority. For example, out of a total value of 150 (of some monetary unit), portion 1 has a value of 60, portion 2 has a value of 60 and portion 3 has a value of 30. Portions 1, 2 and 3 have priorities 1, 2 and 3, respectively. The priority assigned to a portion may relate to a sequence in which collateral agreement value is assigned to a plurality of portions. For example, a portion with a higher priority than another portion may be assigned value before the other portion.

Figure 4:
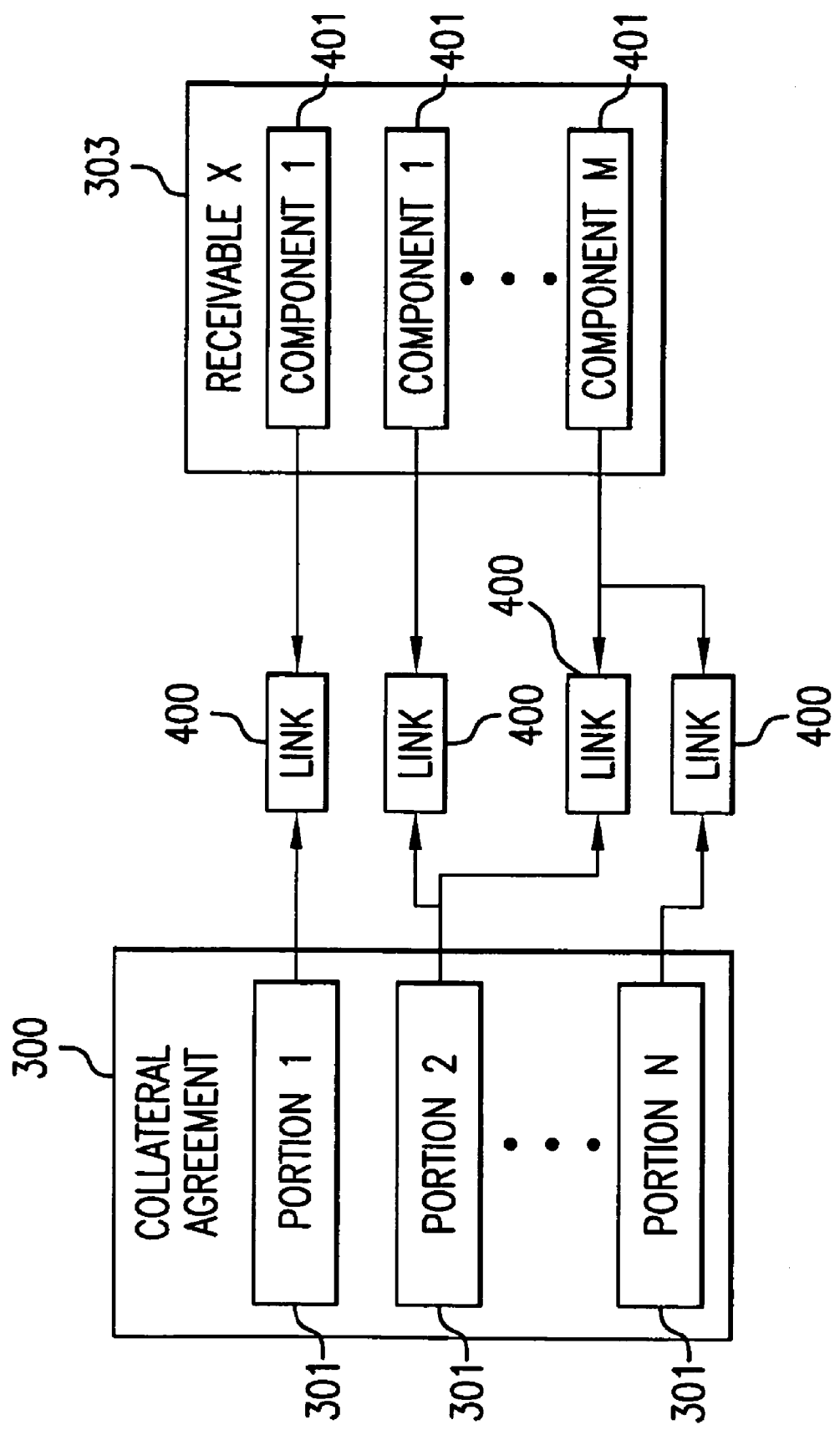
FIG. 4 shows another arrangement of data structures according to embodiments of the present invention.

As noted earlier, according to embodiments, links may be made not only between a collateral agreement and a receivable as a whole, but also between a collateral agreement and various different components of a receivable. More particularly, links may be formed between a portion of a collateral agreement and a component of a receivable. A "component"

of a receivable refers to a discrete element that can be separately secured. For example, a component might be some fixed, limited percentage of a loan (e.g., 50 percent). Other examples of components include interest and fees. FIG. 4 shows an example of links 400 between portions 301 of a collateral agreement 300 and components 401 of a receivable 303.

Figure 5:
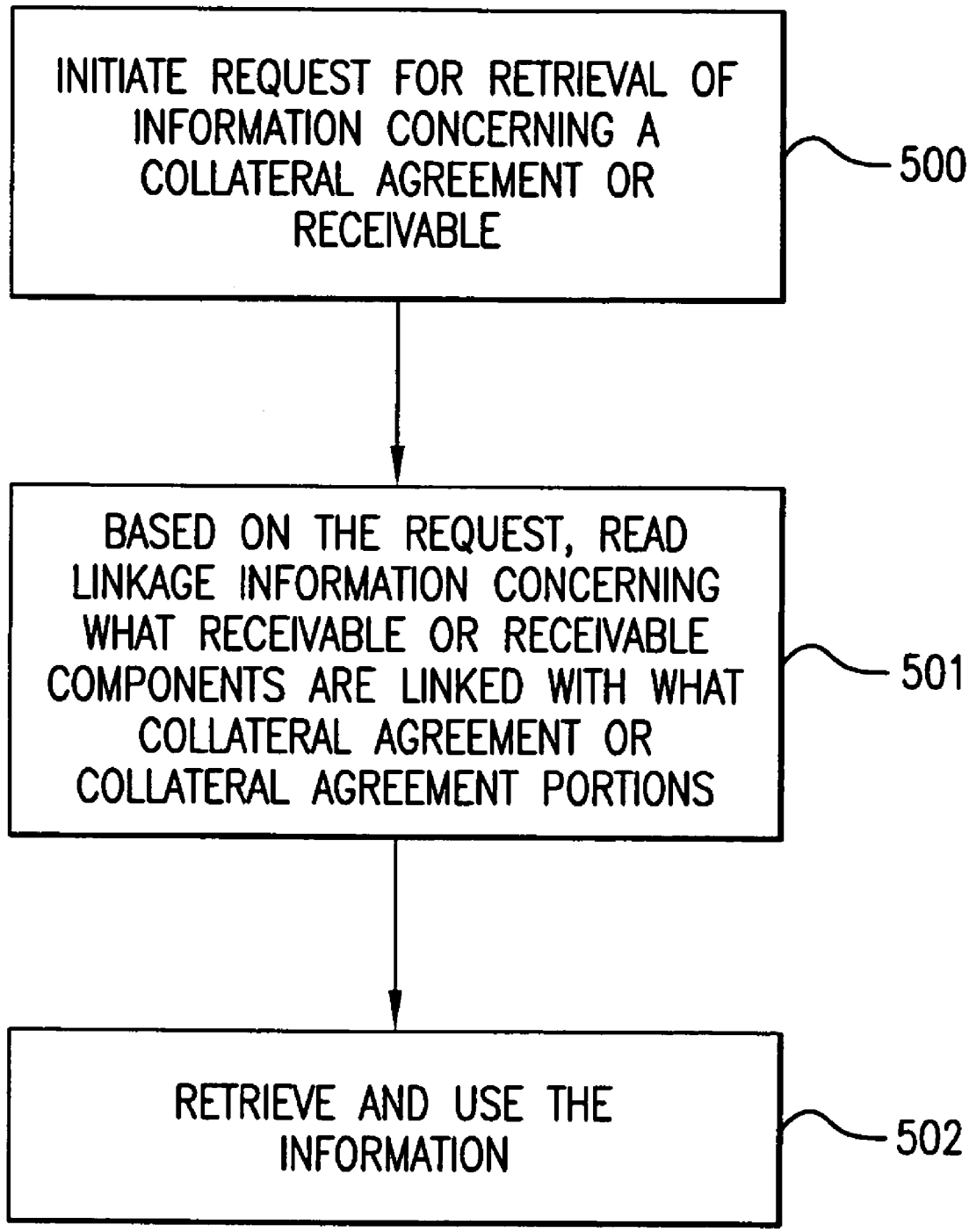
FIG. 5 shows another process flow according to embodiments of the present invention.

As further discussed above, a system of direct linkages between collateral agreements and receivables according to embodiments of the present invention may facilitate efficient retrieval of information relating to global declarations of purpose and their associated collateral agreements and receivables. FIG. 5 shows a process flow for performing a retrieval of such information which may use links established according to embodiments of the present invention. As shown in block 500, a user may initiate a request for retrieval of information concerning a collateral agreement or a receivable. The user could enter the request, for example, via a user interface connected to a computer system configured with software and data structures (e.g., linkage information such as links 302 in FIG. 3) according to embodiments of the present invention. As part of the request, the user might enter, for example, an identifier, such as a serial number, identifying a particular collateral agreement or receivable.

As shown in block 501, based on the request, corresponding linkage information may be read. The information may specify what receivable or receivables, or components thereof, are linked with a given collateral agreement or portions thereof.

As shown in block 502, the information might be retrieved to a local data region of the user (e.g., a data buffer associated with a computer system terminal or workstation) and viewed, analyzed, printed, sent on to another destination, or otherwise used.

For a specific declaration of purpose, as described earlier, links may be formed manually. That is, rather than specifying criteria for prospective receivables as in the case of a global declaration of purpose, for a specific declaration of purpose a link may be formed for by simply defining values establishing a relationship between a collateral agreement (or portion thereof) and a receivable (or component thereof). Along lines discussed above, this process might involve using a user interface to call up, enter and save pertinent data.

Figure 6:
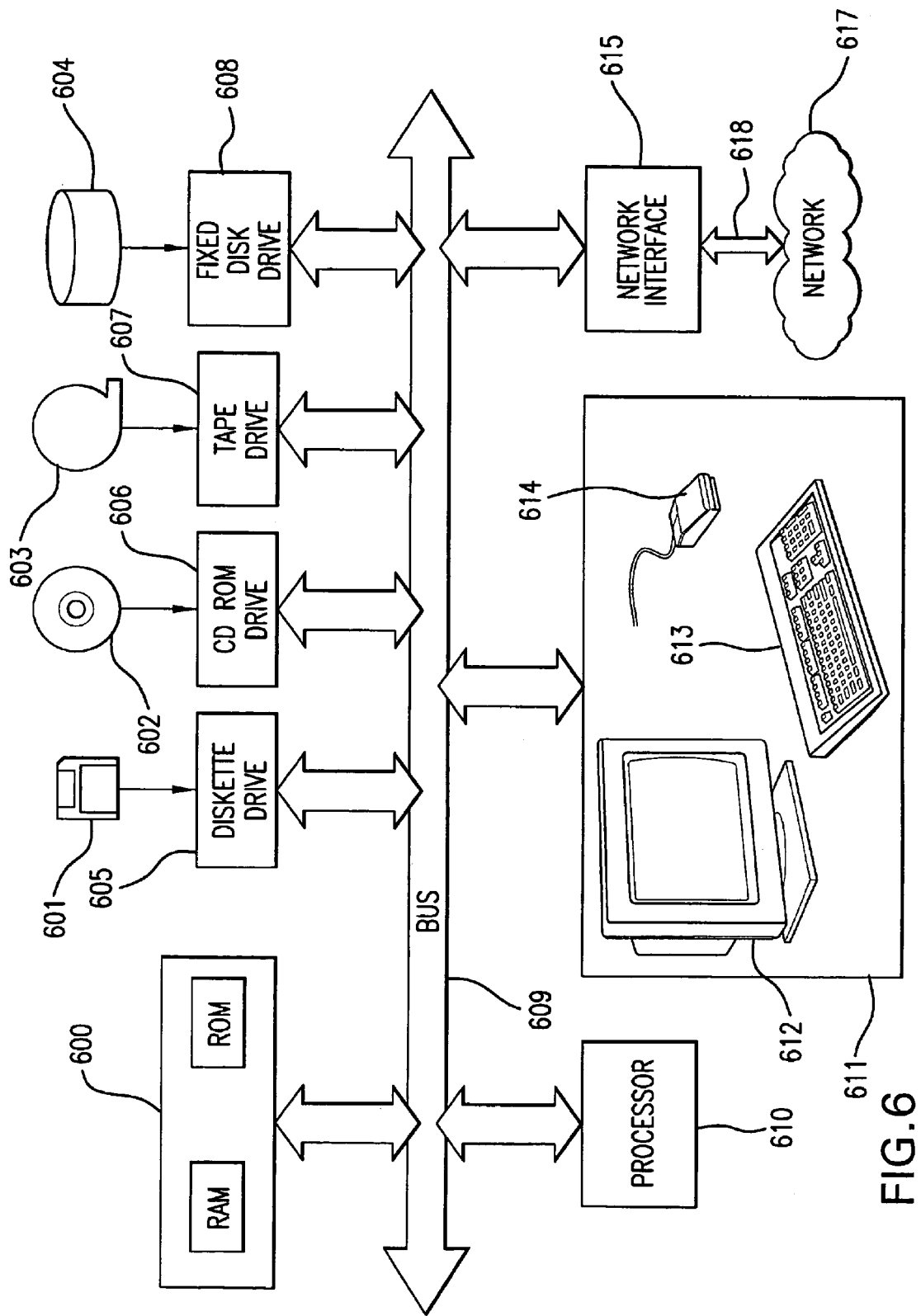
FIG. 6 shows a computer system for implementing embodiments of the present invention.

FIG. 6 shows a high-level representation of a computer system for implementing embodiments of the present invention, such as might be realized by a variety of known and commercially available hardware and software elements. The system may comprise a memory 600 including ROM and RAM, processor 610 and user interface 611 comprising a display device 612, keyboard 613 and mouse 614. Elements may communicate via a system bus 609. The system may further comprise a network 617 connected by a network medium 618 and network interface 615.

A computer program or collection of programs comprising computer-executable instructions according to embodiments of the present invention may be stored and transported on computer-usable media such as diskette 601, CD-ROM 602, magnetic tape 603 and fixed disk 604. The computer instructions may be retrieved from the computer-usable media 601-604 using their respective drives 605-608 into memory 600, and executed by a processor 610. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer-implemented method for managing receivables and collateral agreements in a computer system, the method comprising, creating, by the computer system, a collateral agreement including a plurality of data records representing a plurality of portions of the collateral agreement, each portion having (1) a priority, (2) a global declaration of purpose identifying criteria, and (3) a value associated with the each portion, the criteria specifying requirements to secure a receivable to the corresponding portion of the collateral agreement;

ordering, by the computer system, the plurality of portions into an ordered sequence in accordance to their priorities;

creating, by the computer system, a new receivable data record in the computer system representing a receivable;

comparing, by the computer system, data of the new receivable data record to the criteria identified in the global declaration of purpose of the each portion of the collateral agreement according to the ordered sequence;

when the receivable meets the criteria of the corresponding portion of the collateral agreement, recording, by the computer system, a direct link in the computer system that directly identifies the new receivable data record with a corresponding data record representing the each portion of the collateral agreement record and secures the receivable represented by the new receivable data record to the collateral agreement to allow a one-step determination from the receivable to the corresponding data record representing the each portion of the collateral agreement;

when the receivable does not meet the criteria of any of the each portion of the collateral agreement, recording, by the computer system, the new receivable record in the computer system as an unsecured receivable, without a link to any data records representing the plurality of portions of the collateral agreement.

2. The method of claim 1, wherein the criteria include an identity of a party to the collateral agreement.

3. The method of claim 1, wherein the criteria include a type of the receivable.

4. The method of claim 1, wherein the criteria are applied pursuant to the processing of a new or existing the receivable.

5. The method of claim 1, wherein the criteria are applied pursuant to the processing of a new or existing the collateral agreement.

6. The method of claim 1, wherein the link is formed between the receivable data record and an object representing a portion of the collateral agreement.

7. The method of claim 1, wherein the link is formed between an object representing a component of the receivable and the collateral agreement record.

8. The method of claim 1, wherein the link is formed between an object representing a component of the receivable and an object representing a portion of the collateral agreement.

9. The method of claim 1, wherein the collateral agreement includes a plurality of portions, each of the portions having assigned thereto a value that is a part of a total value of the collateral agreement.

10. A hardware machine-readable medium having stored thereon computer-executable instructions, the executable instructions which, when executed, cause a processor to perform a method for managing receivables and collateral agreements in a computer system, the method comprising:

creating, by the computer system, a collateral agreement including a plurality of data records representing a plurality of portions of the collateral agreement, each portion having (1) a priority, (2) a global declaration of purpose identifying criteria, and (3) a value associated with the each portion, the criteria specifying requirements to secure a receivable to the corresponding portion of the collateral agreement;

ordering, by the computer system, the plurality of portions into an ordered sequence in accordance to their priorities;

creating, by the computer system, a new receivable object data record in the computer system representing a receivable;

comparing, by the computer system, data of the new receivable data record to the criteria identified in the global declaration of purpose of the each portion of the collateral agreement according to the ordered sequence when the receivable meets the criteria of the corresponding portion of the collateral agreement, recording, by the computer system, a direct link in the computer system that directly identifies the new receivable data record with a corresponding data record representing the each portion of the collateral agreement record and secures the receivable represented by the new receivable data record to the collateral agreement to allow a one-step determination from the receivable to the corresponding data record representing the each portion of the collateral agreement;

when the receivable does not meet the criteria of any of the each portion of the collateral agreement, recording, by the computer system, the new receivable record in the computer system as an unsecured receivable, without a link to any data records representing the plurality of portions of the collateral agreement.

11. The machine-readable medium of claim 10, wherein the collateral agreement includes a plurality of portions, each of the portions having assigned thereto a value that is a part of a total value of the collateral agreement.

12. The machine-readable medium of claim 10, wherein the collateral agreement includes a plurality of portions, each of the portions having associated therewith distinct criteria for forming a link between a respective portion and a receivable secured by the collateral agreement.

13. The machine-readable medium of claim 10, wherein the collateral agreement includes a plurality of portions, each of the portions having a priority.

14. The machine-readable medium of claim 10, wherein the link is formed between the receivable data record and an object representing a portion of the collateral agreement.

15. The machine-readable medium of claim 10, wherein the link is formed between an object representing a component of the receivable and the collateral agreement record.

16. The machine-readable medium of claim 10, wherein the link is formed between an object representing a component of the receivable and an object representing a portion of the collateral agreement.

17. A computer-implemented method for managing receivables and collateral agreements in a computer system, the method comprising, creating, by the computer system, a new collateral agreement including a plurality of data records in the computer system representing a plurality of portions of the collateral agreement, each portion having (1) a priority, (2) a global declaration of purpose identifying criteria, and (3) a value associated with the each portion, the criteria specifying requirements to secure a receivable to the corresponding portion of the collateral agreement;

ordering, by the computer system the plurality of portions into an ordered sequence in accordance to their priorities;

comparing, by the computer system, criteria identified in the global declaration of purpose of the each portion of the collateral agreement to a plurality of receivable data records representing receivables, the global declaration of purpose specifying requirements for securing a receivable to the each portion of the new collateral agreement;

when the receivable data record meets the criteria of the global declaration of purpose of the each portion of the new collateral agreement recording, by the computer system, a direct link in the computer system, that directly identifies the each portion of the new collateral agreement to the receivable data record and secures the receivable represented by the new receivable data record to the each portion of the new collateral agreement to allow a one-step determination from the receivable to the each portion of the new collateral agreement, when the receivable data record does not meet the criteria of the global declaration of purpose of the each portion of the new collateral agreement, recording, by the computer system, the new collateral agreement in the computer system without a link to any of the plurality of receivable data records.

18. A hardware machine-readable medium having stored thereon computer-executable instructions, the executable instructions which, when executed, cause a processor to perform a method for managing receivables and collateral agreements in a computer system, the method comprising:

creating, by the computer system, a new collateral agreement including a plurality of data records in the computer system representing a plurality of portions of the collateral agreement, each portion having (1) a priority, (2) a global declaration of purpose identifying criteria, and (3) a value associated with the each portion, the criteria specifying requirements to secure a receivable to the corresponding portion of the collateral agreement;

ordering, by the computer system, the plurality of portions into an ordered sequence in accordance to their priorities;

comparing, by the computer system, criteria identified in the global declaration of purpose of the each portion of the collateral agreement to a plurality of receivable data records representing receivables, the global declaration of purpose specifying requirements for securing a receivable to the each portion of the new collateral agreement, and when the receivable data record meets the criteria of the global declaration of purpose of the each portion of the new collateral agreement, recording, by the computer system, a direct link in the computer system, that directly identifies the each portion of the new collateral agreement to the receivable data record and secures the receivable represented by the new receivable data record to the each portion of the new collateral agreement to allow a one-step determination from the receivable to the each portion of the new collateral agreement, and when the receivable data record does not meet the criteria of the global declaration of purpose of the each portion of the new collateral agreement, recording, by the computer system, the new collateral agreement in the computer system without a link to any of the plurality of receivable data records.

* * * * *